US008429622B2

(12) United States Patent
Nanjundaswamy

(10) Patent No.: US 8,429,622 B2
(45) Date of Patent: Apr. 23, 2013

(54) BUSINESS PROCESS DEBUGGER WITH PARALLEL-STEP DEBUG OPERATION

(75) Inventor: Vijay Kyathanahalli Nanjundaswamy, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 526 days.

(21) Appl. No.: 12/761,294

(22) Filed: Apr. 15, 2010

(65) Prior Publication Data
US 2011/0258579 A1   Oct. 20, 2011

(51) Int. Cl.
G06F 9/44 (2006.01)
G06F 11/00 (2006.01)
G06Q 10/00 (2012.01)

(52) U.S. Cl.
USPC .............. 717/129; 717/125; 714/34; 705/348

(58) Field of Classification Search .................. None
See application file for complete search history.

(56) References Cited

U.S. PATENT DOCUMENTS

| 5,140,671 | A | 8/1992 | Hayes et al. |
| 6,044,305 | A | 3/2000 | Larson et al. |
| 6,275,956 | B1 * | 8/2001 | On et al. ....................... 717/125 |
| 7,013,409 | B2 * | 3/2006 | Gergen et al. .................... 714/34 |
| 7,062,749 | B2 | 6/2006 | Cyr et al. |
| 7,162,664 | B2 * | 1/2007 | Haselden et al. ................ 714/34 |
| 7,222,264 | B2 * | 5/2007 | Muratori et al. ............... 717/124 |
| 7,464,366 | B2 | 12/2008 | Shukla et al. |
| 7,472,378 | B2 * | 12/2008 | Bennett et al. ................. 717/125 |
| 7,519,960 | B2 * | 4/2009 | Mei et al. ....................... 717/129 |
| 7,603,674 | B2 | 10/2009 | Cyr et al. |
| 7,607,124 | B2 * | 10/2009 | Gooty et al. .................... 717/125 |
| 7,849,188 | B2 | 12/2010 | Yu |
| 8,122,292 | B2 * | 2/2012 | Nanjundaswamy ............. 714/34 |
| 2002/0199173 | A1 * | 12/2002 | Bowen .......................... 717/129 |
| 2004/0019831 | A1 * | 1/2004 | Gergen et al. .................... 714/34 |
| 2004/0168155 | A1 * | 8/2004 | O'Farrell et al. ............. 717/129 |
| 2005/0091093 | A1 | 4/2005 | Bhaskaran et al. |
| 2005/0177820 | A1 * | 8/2005 | Mei et al. ....................... 717/129 |

(Continued)

OTHER PUBLICATIONS

Gunther Jornitz et al.; WebSphere Application Server Enterprise Process Choreographer Programming Model; 2003-10; retrieved online on Jan. 1, 2013; pp. 1-24; Retrieved from the Internet <URL: ftp://ftp.software.ibm.com/software/dw/wes/pdf/was/ProcessChoreographerProgrammingModel.pdf>.*

(Continued)

Primary Examiner — Thuy Dao
Assistant Examiner — Hanh T Bui
(74) Attorney, Agent, or Firm — Fliesler Meyer LLP

(57) ABSTRACT

A system for enabling a developer to concurrently debug parallel activities in a business process or workflow, or other software process. A production server includes a business process, which includes a parallel activity. The production server is operable to receive a request to debug the business process, present a graphical representation of the business process, receive input which indicates where a breakpoint is to be added to the business process, and insert the breakpoint. When a request to debug the business process is received, the production server instantiates the business process and executes the instance, and pauses execution of the instance when a breakpoint is reached and enters debug mode. It can then receive an instruction to perform a parallel-step operation on the parallel activity, execute a plurality of current activities in the parallel activity concurrently, and pause execution before executing a next activity and waits for further input.

17 Claims, 12 Drawing Sheets

U.S. PATENT DOCUMENTS

| | | | |
|---|---|---|---|
| 2005/0273757 A1 | 12/2005 | Anderson | |
| 2005/0283674 A1* | 12/2005 | Rivard et al. | 714/34 |
| 2006/0095274 A1 | 5/2006 | Phillips et al. | |
| 2006/0150156 A1 | 7/2006 | Cyr et al. | |
| 2006/0174225 A1 | 8/2006 | Bennett et al. | |
| 2006/0190926 A1 | 8/2006 | Bennett et al. | |
| 2006/0190929 A1 | 8/2006 | Bennett et al. | |
| 2007/0157174 A1 | 7/2007 | Gebhardt et al. | |
| 2007/0165625 A1 | 7/2007 | Eisner et al. | |
| 2007/0168301 A1 | 7/2007 | Eisner et al. | |
| 2007/0171923 A1 | 7/2007 | Eisner et al. | |
| 2007/0171924 A1 | 7/2007 | Eisner et al. | |
| 2007/0180150 A1 | 8/2007 | Eisner et al. | |
| 2007/0240125 A1* | 10/2007 | Degenhardt et al. | 717/129 |
| 2007/0260929 A1* | 11/2007 | Liu et al. | 714/38 |
| 2008/0059964 A1 | 3/2008 | Khodabakchian et al. | |
| 2008/0071595 A1 | 3/2008 | Chang et al. | |
| 2009/0150870 A1* | 6/2009 | Bates | 717/129 |
| 2010/0199260 A1 | 8/2010 | Duggal et al. | |
| 2011/0004565 A1* | 1/2011 | Stephenson et al. | 705/348 |
| 2011/0047415 A1* | 2/2011 | Nanjundaswamy | 714/37 |
| 2011/0137820 A1* | 6/2011 | Reisbich et al. | 705/348 |

OTHER PUBLICATIONS

Anne Meade et al., Challenges of Evolving Sequential to Parallel Code; 2011; retrieved online on Jan. 24, 2013; pp. 1-5; Retrieved from the Internet <URL: http://delivery.acm.org/10.1145/2030000/2024447/p1-meade.pdf?>.*

Lixin Zhou and Ye Tian; Approach of Graphic BPEL Workflow Debugging; 2009; retrieved online on Jan. 1, 2013; pp. 1-5; Retrieved from the Internet <URL: http://ieeexplore.ieee.org/stamp/stamp.jsp?tp=&arnumber=5359953>.*

Fernandez M.G. and Ghosh, S., Abstract of "DDBX-LPP: A Dynamic Software Tool for Debugging Asynchronousdistributed Algorithms on Loosely-Couple Parallel Processor", IEEE International Conference on Systems, Man, and Cybernetics, vol. 1, Publication Date Oct. 13-16, 1991, pp. 639-644.

Oasis WSBPEL Technical Committee, "Oasis BPEL 2.0 Primer", Oasis Standard, Publication Date: Apr. 11, 207, pp. 1-83.

Oasis WSBPEL Technical Committee, "Oasis BPEL 2.0 Primer", Oasis Standard, Publication Date: Apr. 11, 207, pp. 84-191.

Oasis WSBPEL Technical Committee, "Oasis BPEL 2.0 Primer", Oasis Standard, Publication Date: Apr. 11, 207, pp. 192-264.

Wismuller, Roland, Abstract of "Interactive Debugging and Performance Analysis of Massively Parallel Applications", ScienceDirect-Parallel Computing, vol. 22 Issue 3, Publication Date: Mar. 1996, pp. 415-442.

Wismuller, Roland, Abstract and First Page of "Debugging Message Passing Programs Using Invisible Message Tags", Book Series: Lecture Notes in Computer Science, Spring Berlin/Heidelberg, vol. 1332, Copyright 1997, pp. 295-302.

* cited by examiner

BUSINESS PROCESS DEBUGGER WITH PARALLEL-STEP DEBUG OPERATION

CROSS REFERENCE TO RELATED APPLICATIONS

This application is related to the following patent applications, which are each hereby incorporated by reference in their entirety: U.S. Provisional Patent Application No. 61/235,351 entitled "Debugging Of Business Flows Executing In Production Servers," inventor Vijay Kyathanahalli Nanjundaswamy, filed Aug. 19, 2009; and U.S. patent application Ser. No. 12/648,310 entitled "Debugging Of Business Flows Deployed In Production Servers," inventor Vijay Kyathanahalli Nanjundaswamy, filed Dec. 29, 2009, subsequently issued as U.S. Pat. No. 8,122,292.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the present invention are generally related to application servers, workflows and software debuggers, and particularly to a system and method for supporting parallel-step debug operations in a business process or software workflow debugger.

BACKGROUND

A debugger is a software tool that allows software developers to debug software programs, generally written in a high level programming language such as, for example, Java or C++, and enabling the developer to review or analyze the state of a software program at different points in its execution. Typical debug operations that can be performed by the developer include the opportunity to set/clear breakpoints, single-step, resume and view/edit variables. Debuggers are typically offered as one tool or part of an integrated development environment (IDE) that in turn is integrated with a runtime environment, for debugging the software program under development.

Business processes, which may also be referred to as business flows or workflows, provide a level of abstraction above programming languages such as Java or C++, making them easier for non-programmers to use to describe desired processing within a particular business process. An example language used to define business processes is the Business Process Execution Language (BPEL), which is an XML-based executable language for specifying orchestration between web services that comprise a business process. A BPEL Debugger allows developers to debug a BPEL business process for execution in a BPEL runtime environment.

FIG. 1 shows an illustration of a typical networked computing environment. As shown in FIG. 1, a typical networked computing environment can include a plurality of clients 100, such as Client 1, Client 2, and Client N connected to a network 102, such as the Internet. The clients can be, for example, personal computers, workstations, mobile computing devices, or any other networkable device. Also connected to the network are a plurality of servers 104 such as Server 1, Server 2, and Server N. These servers can include application servers and web servers which provide services in response to requests that are received over the network from the clients or other servers or services. A developer system 106 can provide a software developer with access to the network to create, modify, and/or deploy business processes, which can then be utilized by the plurality of clients. The developer can deploy the business processes to a production server 108, which is typically a computer server system that stores and executes the business processes. The production server can access additional business processes stored in a database 110. The production server can receive service requests from the plurality of clients, or the plurality of servers, and execute an appropriate business process. Execution of the appropriate business process can include invoking one or more web services offered by the plurality of servers.

FIG. 2 shows a diagram illustrating a typical interaction between a developer system and a production server. As described above, developer system 106 can access production server 108 to create, modify, and/or deploy business processes. Developer system can be a personal computer, workstation, mobile device, or any networkable device. As shown in FIG. 2, the developer system can include a computer readable medium 202 and processor 200 operating thereon, in addition to an integrated development environment (IDE) 204 and an internet browser 206. The developer system can include tools for creating and modifying the business processes. These tools can include a debugger which enables the developer to test, or debug, business processes, by controlling the execution of the business processes and providing input from the developer at various stages of execution. Additionally, the developer system can include an internet browser 206 which a developer can use to access a web interface for a business process management console at a production server. Such a business process management console can be used to deploy & manage business processes running on the production server, including instantiation and runtime debugging of business processes.

When a developer has created a business process, the developer can deploy the business process from the developer system to the production server. As shown in FIG. 2, the production server can similarly include a computer readable medium and processor operating thereon. Business processes can be written in any appropriate language, such as BPEL. The production server can also store business processes, either as source code or compiled code, locally on the computer readable medium, on database 110, or on any other data store accessible to the production server. When the production server receives a service request, the production server can retrieve an appropriate business process, and compile it if necessary. The compiled code is then passed 214 to a business process engine for execution. The business process engine can be a BPEL engine 214 or other appropriate engine, and the production server can include a BPEL compiler 212 or other suitable compiler.

As with any software under development, thorough testing can be used to ensure a stable and reliable product that performs as expected and provides the functionality desired by the developer and the end users. As described above, debugging is a common process used to test software both prior to and after deployment. A debugger can be provided as part of an IDE or as a standalone product and can be executed locally or accessed remotely, such as via a web service. A debugger can be used to debug code at the source code, or business process level (such as BPEL code) or at the compiled code level (such as the underlying Java, C#, or other lower level code). As also described above, debuggers provide a means for a developer to test business processes, by executing activities one at a time sequentially using single-step execution, and presenting options to the developer at various points during execution. However, business processes do not always proceed sequentially, and some activities can include parallel branches, which cannot be reliably tested by the standard single-step debugging technique. This is the general area that embodiments of the invention are intended to address.

SUMMARY

In accordance with an embodiment, a system is provided for enabling a developer to concurrently debug parallel activities in a business process or workflow, or other software process. The system includes a production server, executing on the computer, operable to receive requests to execute the at least one business process. The production server includes at least one business process, which includes a parallel activity, and a graphical user interface (GUI), which is accessible to one or more developer systems. The GUI shows a graphical representation of the at least one business process. The production server is operable to receive a request to debug the at least one business process through the GUI. The production server is also operable to present a graphical representation of the at least one business process, and receive input which indicates where one or more breakpoints are to be added to the at least one business process. The production server is further operable to insert the one or more breakpoints to the at least one business process. When a request to debug the at least one business process is received from a client system, the production server instantiates an instance of the at least one business process and executes the instance. The production server then pauses execution of the instance when a breakpoint is reached and enters debug mode, and receives an instruction to perform a parallel-step operation on the parallel activity. The production server then executes a plurality of current activities in the parallel activity concurrently, and pauses execution before executing a next activity and waits for further input from the client system.

DETAILED DESCRIPTION

Figure 1:
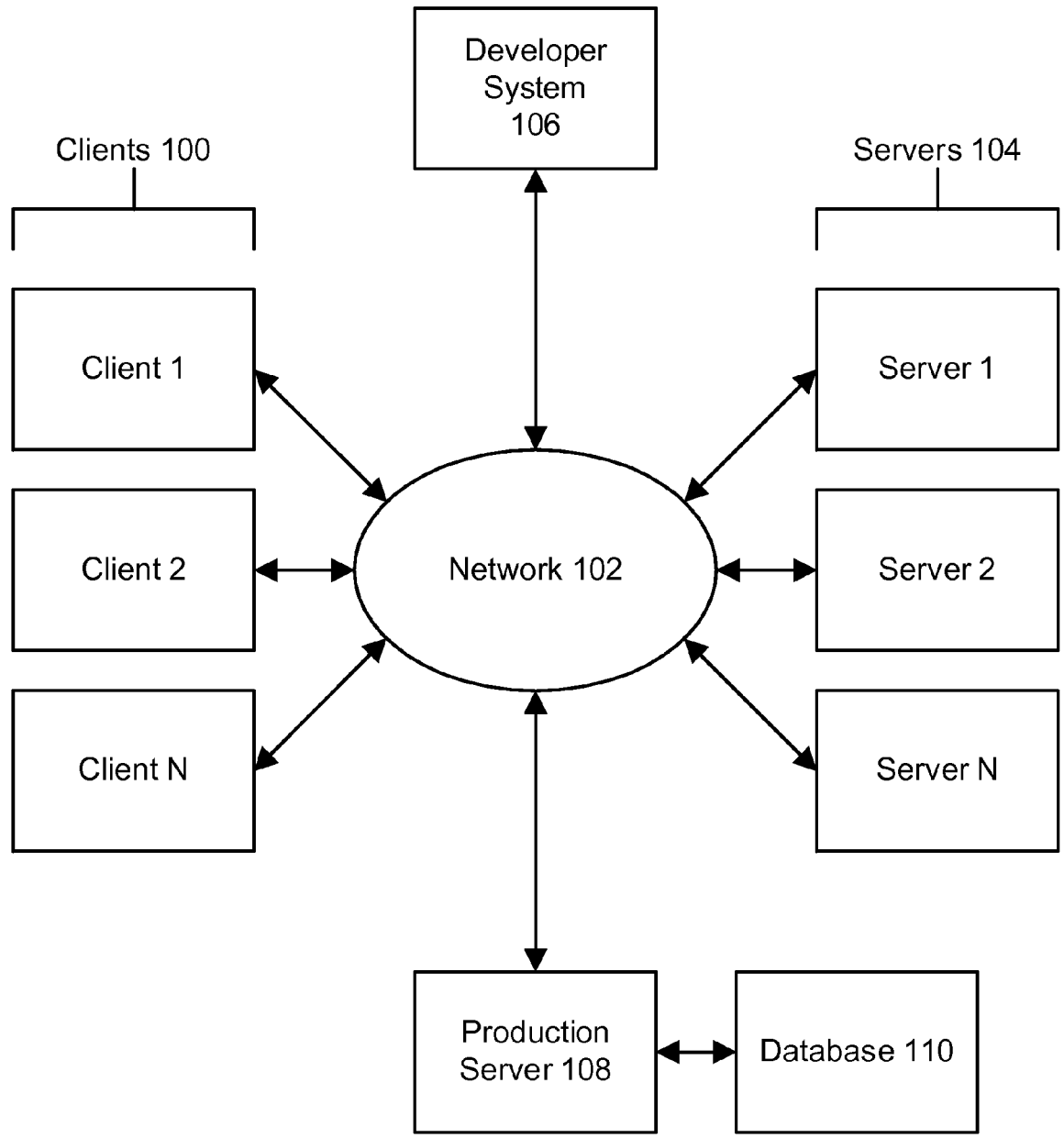
FIG. 1 shows an illustration of a networked computing environment.

As described above, with any software under development, thorough testing can be used to ensure a stable and reliable product that performs as expected and provides the functionality desired by the developer and the end users. Debugging is a common process used to test software both prior to and after deployment. A debugger can be provided as part of an IDE or as a standalone product and can be executed locally or accessed remotely, such as via a web service. A debugger can be used to debug code at the source code, or business process, level (such as BPEL code) or at the compiled code level (such as the underlying Java, C#, or other lower level code). As also described above, debuggers provide a means for a developer to do a fine-grained test of the business processes, by doing single-step executing one activity at a time. However, business processes do not always proceed sequentially, and some activities may branch into parallel branches, which cannot be reliably tested by debugging sequentially using single-step operations.

Business processes are comprised of activities. Each activity defines business operations and logic to be executed. Activities can contain other activities, and such activities are referred to herein as container activities. Each container activity includes one or more contained activities which can either be primitive activities (i.e., activities which do not contain any additional activities) or another container activity.

In BPEL, container activities are referred to as structured activities and include activities such as Switch, Flow, Sequence, etc. Additionally, in BPEL, primitive activities are referred to as basic activities. It is understood that although examples using BPEL are shown herein, any business process or workflow language is compatible with embodiments of the present invention and the phrases 'container activity', 'contained activity' and 'primitive activity' correspond to similar constructs across any business process or workflow language.

Contained activities can be executed in parallel or in sequence, depending on the semantics of the container activity. When a container activity includes activities that are executed in parallel, it is referred to as a parallel activity.

While embodiments of the present invention are described herein as being applicable to debugging of business processes, other embodiments are also applicable to other programming languages that utilize parallel constructs and semantics similar to those used in business process languages such as BPEL.

Described herein, in accordance with an embodiment, a system is provided for enabling a developer to concurrently debug parallel activities in a business process or workflow, or other software process. The system includes a production server, executing on the computer, operable to receive requests to execute the at least one business process. The production server includes at least one business process, which includes a parallel activity, and a graphical user interface (GUI), which is accessible to one or more developer systems. The GUI shows a graphical representation of the at least one business process. The production server is operable to receive a request to debug the at least one business process through the GUI. The production server is also operable to present a graphical representation of the at least one business process, and receive input which indicates where one or more breakpoints are to be added to the at least one business process. The production server is further operable to insert the one or more breakpoints to the at least one business process. When a request to debug the at least one business process is received from a client system, the production server instantiates an instance of the at least one business process and executes the instance. The production server then pauses execution of the instance when a breakpoint is reached and enters debug mode, and receives an instruction to perform a parallel-step operation on the parallel activity. The production server then executes a plurality of current activities in the parallel activity concurrently, and pauses execution before executing a next activity and waits for further input from the client system.

Figure 3:
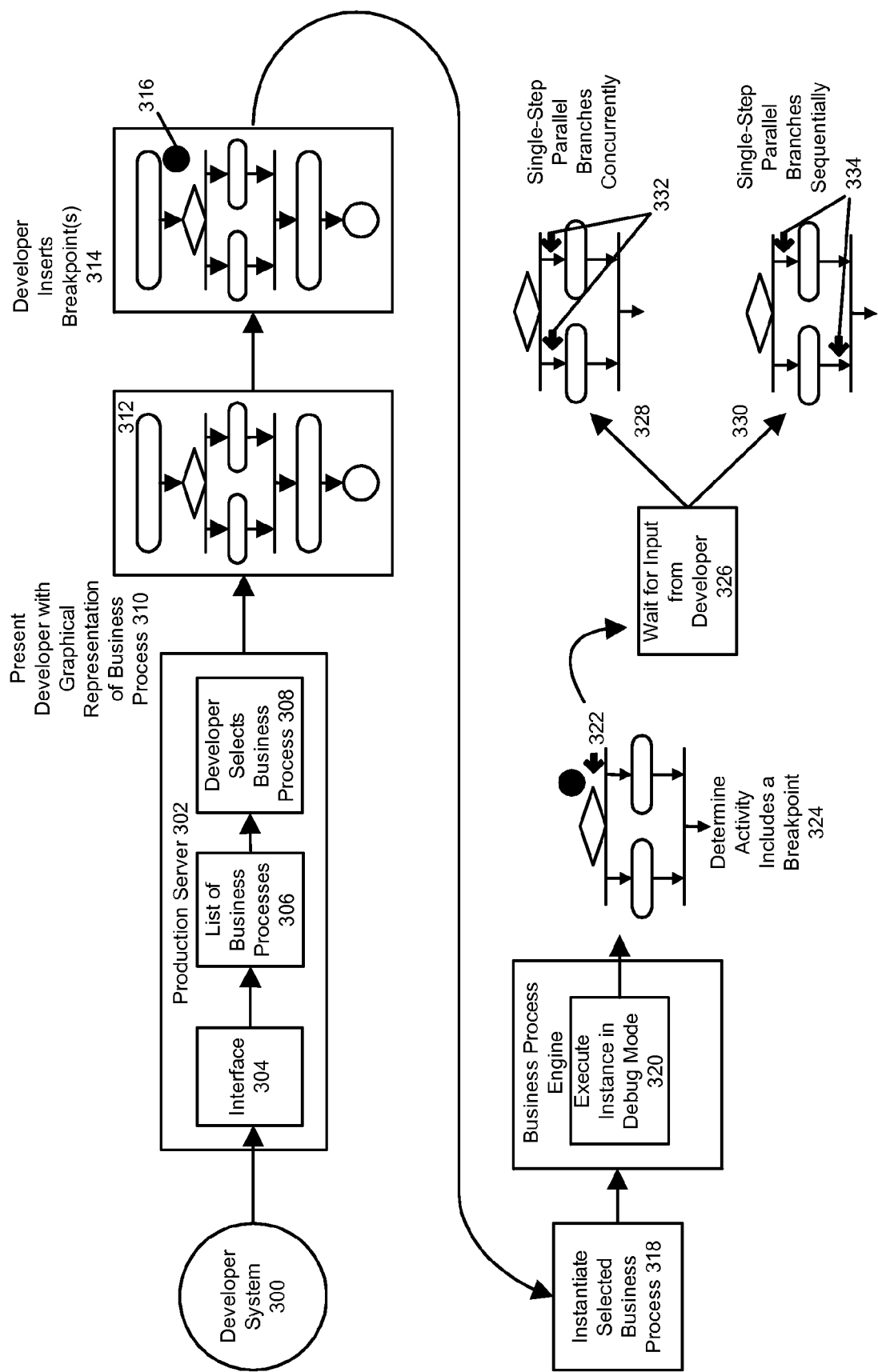
FIG. 3 shows a block diagram of a system for enabling a developer to debug a business process.

FIG. 3 shows a block diagram of a system for enabling a developer to debug a business process. In accordance with an embodiment, as shown in FIG. 3, a developer using developer system 300 can access business processes deployed to production server 302 through interface 304. In accordance with an embodiment, the interface can be a graphical user interface (GUI) that displays a list of business processes 306 deployed to the production server and available to the developer to be modified or debugged. Additional details regarding an exemplary embodiment of a GUI implementing these features is discussed below with respect to FIGS. 8-12.

The compiled code defining the business processes can be stored locally at the production server or in a database or other data store accessible to the production server. The developer can then select 308 a business process to debug, for example by selecting a business process from the list of business processes displayed in the GUI.

In accordance with an embodiment, the developer can then be presented in the GUI 310 with a graphical representation of the selected business process 312. The graphical representation of the selected business process can be presented as a flow of activities at 312. The developer can insert breakpoints 314, such as breakpoint 316, in the selected business process. A breakpoint can be added at a particular activity in the business process. Furthermore, when using container activities, which are those activities that are comprised of multiple primitive activities, breakpoints can be added to the contained activities, if needed by the developer.

Although the user can add any number of breakpoints to the business process, only one breakpoint encountered during execution is needed to enter debug mode. Once in debug mode, the user can proceed to debug the business process using additional debug operations including single-step and parallel-step operations, as described in more detail below.

During execution of the business process, when the system determines the presence of a breakpoint, execution is paused before the activity associated with that breakpoint is executed, and the system waits for input from the developer. The breakpoints can be represented graphically in the GUI, and added to the graphical representation of the business process, such as shown by breakpoint 316.

Input from the developer can include a resume execution operation, that instructs the business process engine to resume executing the business process until another breakpoint is encountered.

Input from the developer can also include a single-step operation, that instructs the business process engine to execute the next activity and then wait for further input from the user.

Breakpoints can be recorded in a table or other data structure. During execution, the business process engine can compare the current activity with the breakpoint data stored in the table or other data structure, to determine whether that activity is associated with a breakpoint.

In accordance with an embodiment, after the developer has added one or more breakpoints, the production server instantiates the selected business process 318, in response to a service request that may be initiated by the developer. Multiple instances of the selected business process can be instantiated by the production server to service multiple requests, which can be executed in parallel. When execution of an instance reaches a breakpoint, execution enters Debug mode 320. The developer can then perform various debug operations on the business process.

In accordance with an embodiment, while executing in debug mode, the business process engine checks each activity before proceeding for breakpoints 322. These breakpoints can include user-specified breakpoints or implicit breakpoints. Implicit breakpoints are added to the business process as part of a single-step or parallel-step debug operation. Implicit breakpoints can also be stored in a breakpoint data structure that links each breakpoint to its associated activity. When the business process engine determines that a breakpoint is present 324, the business process engine suspends execution of the instance and waits for input from the developer 326.

In accordance with an embodiment, the business process engine also checks whether the current activity (at which execution has paused due to a breakpoint) is a parallel activity (i.e., a container activity that has parallel branches like the BPEL Flow activity).

If it is a parallel activity, then the business process engine can provide the developer with additional options, such as to perform a parallel-step debug operation. The developer can then choose to step through parallel branches concurrently 328 using the parallel-step operation, in which case the current activity in each parallel branch is executed generally simultaneously 332, and execution is paused before the next activity or activities. This more closely models runtime behavior.

Additionally, or alternatively, the developer can choose to single-step each activity sequentially 330, in which case each activity of each parallel branch is executed serially 334, one after another. Execution is again paused after one activity (in the case of single-step), or one activity in each branch (in the case of parallel-step), has been executed.

Figure 4:
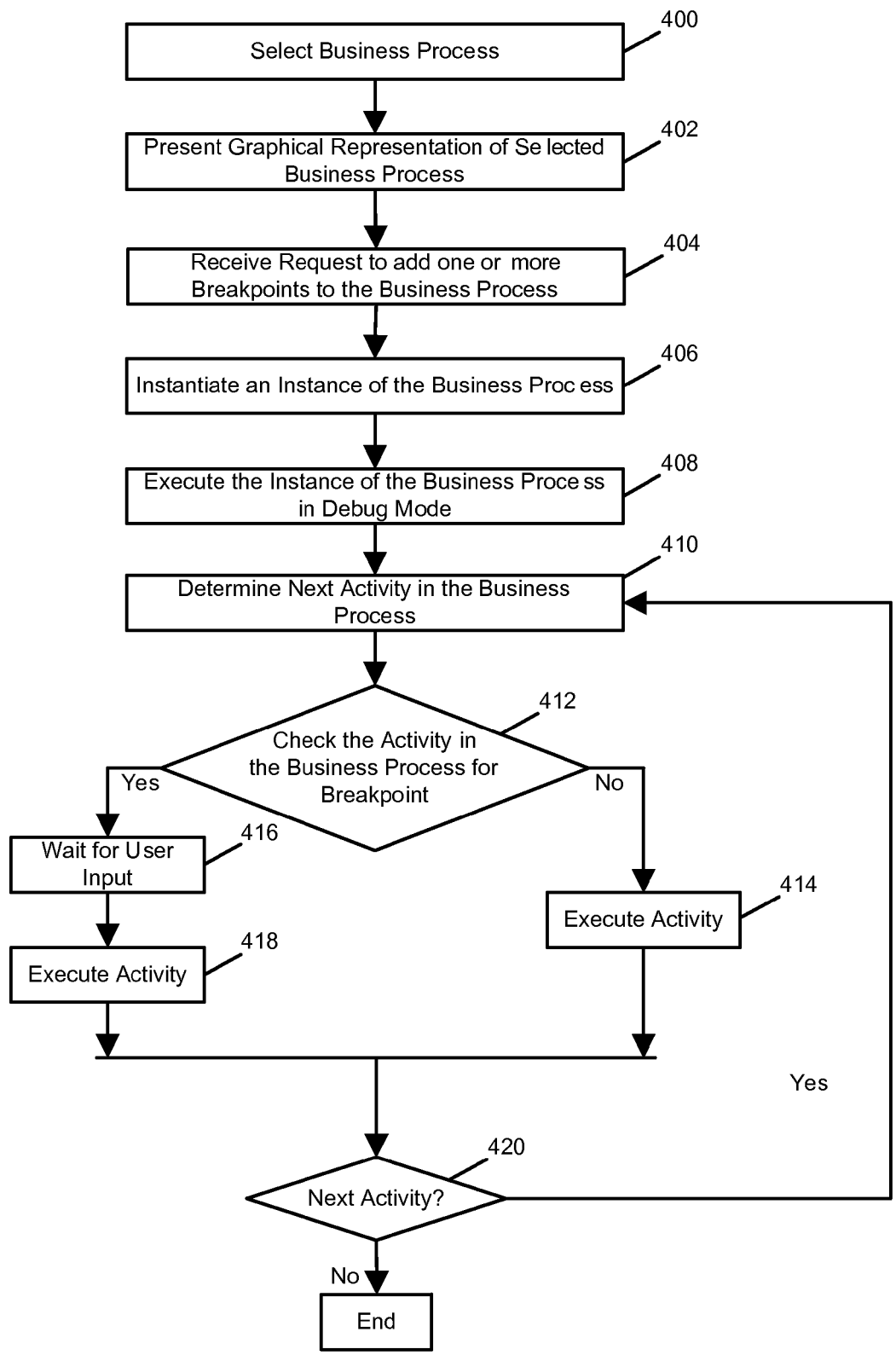
FIG. 4 shows a flow chart illustrating a method for debugging a business process in accordance with an embodiment.

FIG. 4 shows a flow chart illustrating a method for debugging a business process in accordance with an embodiment. As shown in FIG. 4, at step 400 a selection of a business process is received from a developer. The business process can be in active development at a developer system, or alternatively can already be deployed to a production server. The developer can select the business process from a list of available business processes using a graphical user interface (GUI). At step 402, the developer is presented with a graphical representation of the selected business process. At step 404, requests are received from the developer to add one or more breakpoints to the business process. The breakpoints can be added to particular activities within the business process. When the business process engine instantiates a business process for a service request and encounters a breakpoint, execution pauses to wait for input from the developer. In accordance with an embodiment, user-specified breakpoints can be displayed graphically on the graphical representation of the selected business process. The business process can be executed in a single-step debug mode, which executes the current activity and inserts an implicit breakpoint at the next activity.

Implicit breakpoints are interpreted by the system similarly to user-specified breakpoints, i.e., when executed in single-step debug mode, the business process pauses for user input after executing the current activity, when an implicit breakpoint is reached. In accordance with an embodiment, implicit breakpoints are not shown on the graphical representation of the business process.

As shown in FIG. 4, at step 406, the production server instantiates an instance of the selected business process, in response to a service request. In accordance with an embodiment, the production server can instantiate multiple instances of the selected business process to be executed in parallel, to service multiple requests for the business process. At step

408, the business process engine on the production server, executes the instance of the business process and on encountering the first breakpoint the instance enters debug mode. In accordance with an embodiment, a business process is automatically executed in debug mode when a breakpoint is reached during execution by the system. While in debug mode, the business process engine checks for the presence of breakpoints before executing each activity in the business process.

At step 410, the business process engine determines the next activity to be executed. The next activity to be executed is determined after the current activity has completed. Depending on how the current activity has completed (for example, whether it has completed successfully or if an exception has been thrown) the next activity or activities may vary. In accordance with an embodiment, the next activity can be determined by the flow control block, which can use a token-based routing system.

At step 412, the business process engine checks the next activity in the business process for a breakpoint. If there is no breakpoint at the next activity, then the business process engine proceeds directly to step 414 and executes the activity. At step 420, the business process engine determines if there are any additional activities in the business process. If there are no additional activities, then execution of the business process ends. If there are additional activities, then processing returns to step 410.

Returning to step 412, as shown in FIG. 4, if there is a breakpoint at the next activity, at step 416 the business process engine suspends execution of the selected business process and waits for input from the user, e.g., the developer. The developer can choose to take any of several actions based on the current state of the business process, including stepping through the execution of subsequent activities manually or resuming execution of the business process. At step 418, in response to a single-step (or resume) operation from the developer, the business process engine can execute the activity. As shown in FIG. 4, at step 420, the business process engine checks whether there are any additional activities. If there are additional activities, then the execution returns to step 410. If there are no additional activities, execution of the selected business process ends.

Figure 5:
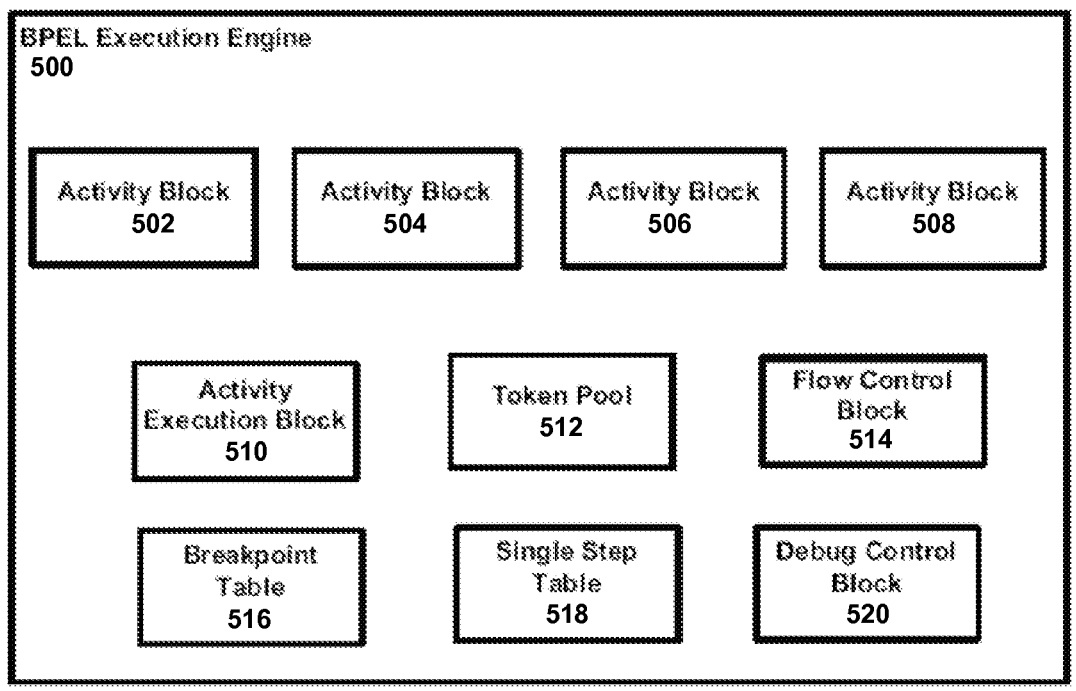
FIG. 5 shows an internal block diagram of a business process engine.

FIG. 5 shows an internal block diagram of a business process engine. In accordance with an embodiment, a production server can include a business process engine such as a BPEL execution engine 500. Although the embodiment shown in FIG. 5 uses a BPEL execution engine, one of ordinary skill in the art would understand that any business process engine could be utilized. The business process engine includes activity blocks 502-508, activity execution block 510, token pool 512, breakpoint table 516, single-step table 518, flow control block 514 and debug control block 520. Flow control block 514, activity execution block 510, and debug control block 520 are common for all the business processes executing in the BPEL Engine and thus form part of the run-time environment. Activity blocks 502-508 are specific to a business process and are shared by all instances of the business process. Token pool 512, breakpoint table 516 and single-step table 518 may be replicated for a corresponding number of instances of the business process. Each of the blocks is described in detail below.

Each of activity blocks 502-508 represents the execution code for a corresponding primitive or container activity specified in the business flow language (such as BPEL). Similarly, activity blocks corresponding to other activities specified in the business process may be created and loaded for execution by BPEL execution engine 500.

In accordance with an embodiment, each activity block is in a compiled format containing Java byte-code/machine level instructions ready for execution, in contrast to BPEL source code, which typically contains activities that are specified by a process modeler/developer. For example, when the BPEL activities specifying a business process is first converted to a corresponding set of instructions in low level Java programming language, each of the activity blocks correspond to a compiled Java class generated for a corresponding activity specified in the business process.

Each activity block is designed to execute only when enabled by a flow control block. In accordance with an embodiment, flow control can be effected using a token-based system. Under token-based flow control, an activity can be executed by the activity execution block 510, when a token for that activity is available. Each activity block on completion, is also designed to generate tokens for the next activity (or set of activities) to be executed by BPEL execution engine 500. The tokens generated are stored in token pool 512 and are consumed/removed when a corresponding activity block is executed. Although a token-based flow control function is described, any alternate flow control function is compatible with embodiments of the present invention.

For example, activity block 502 is designed to execute when a token associated with that activity is available and, on completion, to generate a token identifying the subsequent activity to be executed. The initial token for the first activity is generated by the flow control block 514 on instantiation of the business process.

Flow control block 514 controls the sequence of execution of the specific activities (the execution path) in coordination with activity execution block 510 and keeps track of the status of execution of activity blocks (e.g. 502-508) currently executing in the BPEL execution engine 500. The control on the order of execution of different activities is done using tokens (as noted above), with availability of each token indicating that a corresponding activity in the business process is ready to be executed next.

Flow control block 514 invokes activity execution block 510 to check whether an activity is ready to execute depending on the availability of a corresponding token and then performs/executes the activity, if the corresponding token is available.

Activity execution block 510 provides a context for execution of activity blocks in BPEL execution engine 500. Activity execution block 510 has access to token pool 512 and on instruction from flow control block 514 can check availability of token in token pool 512 and execute the corresponding activity block.

Breakpoint Table 516 contains user-specified breakpoints and implicit debugger breakpoints for the associated instance of business process being debugged.

Single Step Table 518 contains activities on which a single-step operation is to be performed.

Debug Control Block 520 controls the debug mode execution of a business process instance managing entries in Breakpoint table 516 and Single Step Table 518, and interacting with the Flow Control Block 520. It is responsible for receiving debug operations from user, performing debug operations invoking the Flow Control Block 520, and returning responses that update the graphical representation of the business process instance displayed to the user.

Figure 6:
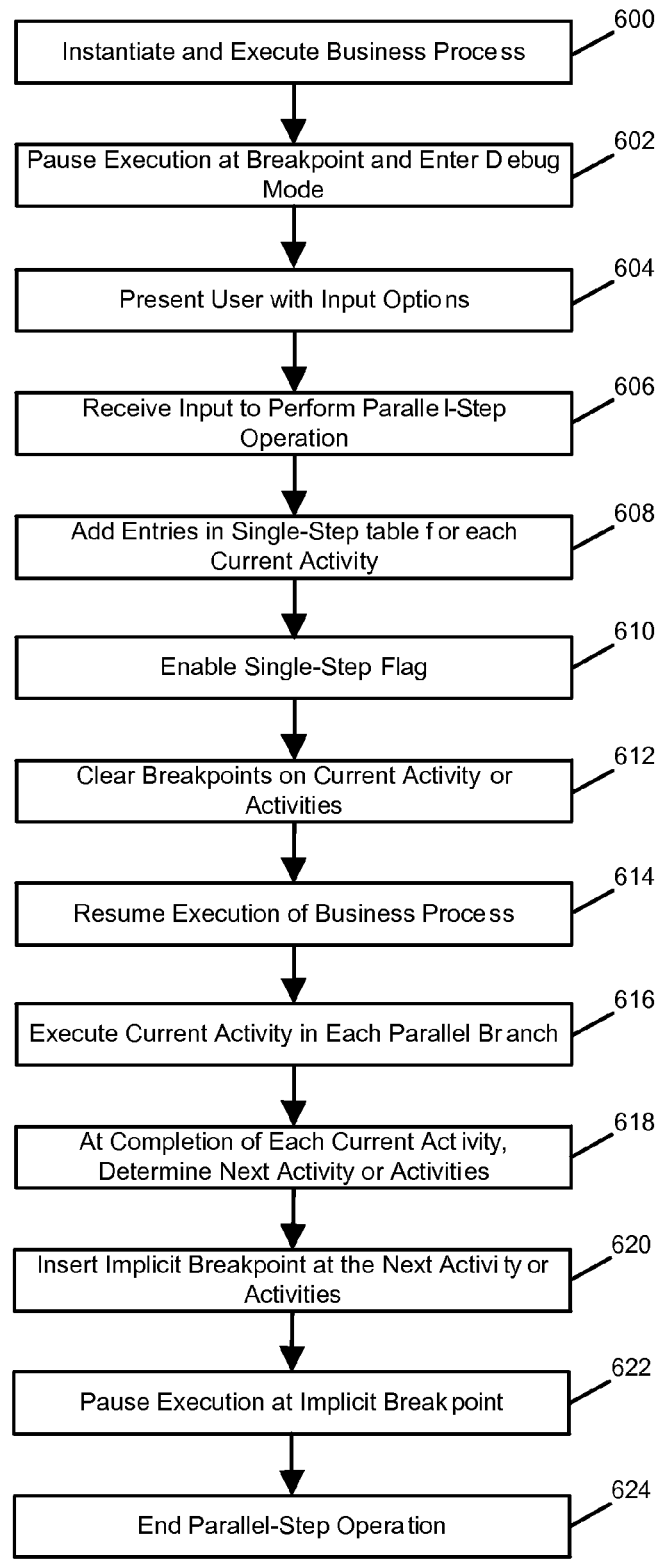
FIG. 6 shows a flowchart of a method for performing a parallel-step debug operation, in accordance with an embodiment.

FIG. 6 shows a flowchart of a method for performing a parallel-step debug operation, in accordance with an embodiment. At step 600, a business process is instantiated and starts execution. At a time prior to step 600, a user has set at least one breakpoint in the business process as described above with respect to FIG. 4. At step 602, execution of the instance is paused when a breakpoint is reached and execution enters debug mode. Here, the system pauses to wait for user input.

At step 604 the user is presented with several options which can include a resume operation, a single-step operation, and a parallel-step operation. The options presented to the user depend on the current activity. For example, if the current activity is a primitive activity and is not part of a parallel activity, the parallel-step operation can be disabled or hidden from the user. However, if the current activity is a contained activity within a parallel activity, such as the Flow activity in BPEL, then the parallel-step operation can be enabled. A parallel-step operation executes each current activity within the parallel activity in the business process and then pauses at the next activity.

At step 606, the system receives input from the user to perform a parallel-step operation. At step 608, an entry is added to a data structure, such as the single-step table 518, for each current activity. At step 610, a single-step flag is enabled. This indicates to the system that a single-step or a parallel-step debug operation has begun. At step 612, the implicit breakpoint on the current activities are removed. At step 614, execution of the instance is resumed and at step 616 the current activity on each parallel branch is executed.

At step 618, upon completion of each current activity, the next activity or activities are identified by the flow control block and tokens generated for them. At step 620, the system checks the single step flag and inserts implicit breakpoint for each of these next activities (unless there is already a user specific breakpoint). The breakpoint, or breakpoints, is stored in a data structure such as breakpoint table 516, which identifies the activity associated with that breakpoint. This breakpoint can be shown to the user graphically on a graphical representation of the business process, if it is an explicit user breakpoint, or hidden from the user, if it is an implicit breakpoint. The system then resets the single step flag and removes the entries from the single-step table for the completed current activities.

At step 622, execution of the instance on the parallel branches reaches the implicit breakpoints and execution is paused, on each of the parallel branches. Thus, in response to the user's instruction to perform a parallel-step operation, one activity has been executed in each parallel branch and execution has been paused prior to executing the next activity or activities on the branch. At step 624, the parallel-step operation is complete and the system waits for further instructions from the user.

In accordance with an embodiment, the system enables a business process to be executed in a single-step debug mode that supports parallel step debugging. When executed in the single-step debug mode, an implicit breakpoint is set at each next activity in the business process, including at each activity within any container activities that may be included in the business process. In single-step debug mode, the business process engine adds implicit breakpoints to the next activity or activities in the business process, if there is no pre-existing user specified breakpoint. After executing the current activity, the business process engine identifies the breakpoint associated with the next activity and pauses execution of the business process and waits for user input. Such user input can include, but is not limited to, directions to: resume execution, single-step execution, and parallel step execution which is available within parallel activities.

An option to perform parallel step execution can be presented to the user when single-step execution enters a parallel activity. When a user selects a parallel step execution, the current activity on each parallel branch is executed concurrently. The user can continue to select parallel step executions until all of the activities of each parallel branch have been executed. The user can then use single-step executions if the next activity is not contained in a parallel activity, or can resume execution to complete execution of the business process.

As described above, in accordance with an embodiment, the business process engine can utilize tokens to control the execution of business processes. Tokens are associated with individual activities of a business process, and are dynamically allocated during execution of the business process. The business process engine can check for the presence of an activity's token prior to executing that activity. This prevents activities from executing out of sequence, or before a previous activity has completed its execution. When one activity completes, it generates the token or tokens for the subsequent activity or activities. As tokens are generated, they can be added to a token pool. Then, when an activity is ready to execute, its token can be retrieved and consumed from the token pool, prior to execution.

In accordance with an embodiment, tokens can also be used during debugging to similarly control execution of business processes. When the business process engine determines the next activity, it can first check for that activity's associated token. If the activity's associated token is not available, then the business process engine suspends execution of that activity until the token is generated.

If the token is present, then the business process engine can check the activity for breakpoints by comparing the activity identifier with entries in breakpoint table or similar data structure, as described above.

If a token is not present, the GUI can hide any options for continuing with the debug operation (such as resume execution, single-step, or parallel step) from the user, to prevent the user from attempting debug operations.

Figure 7:
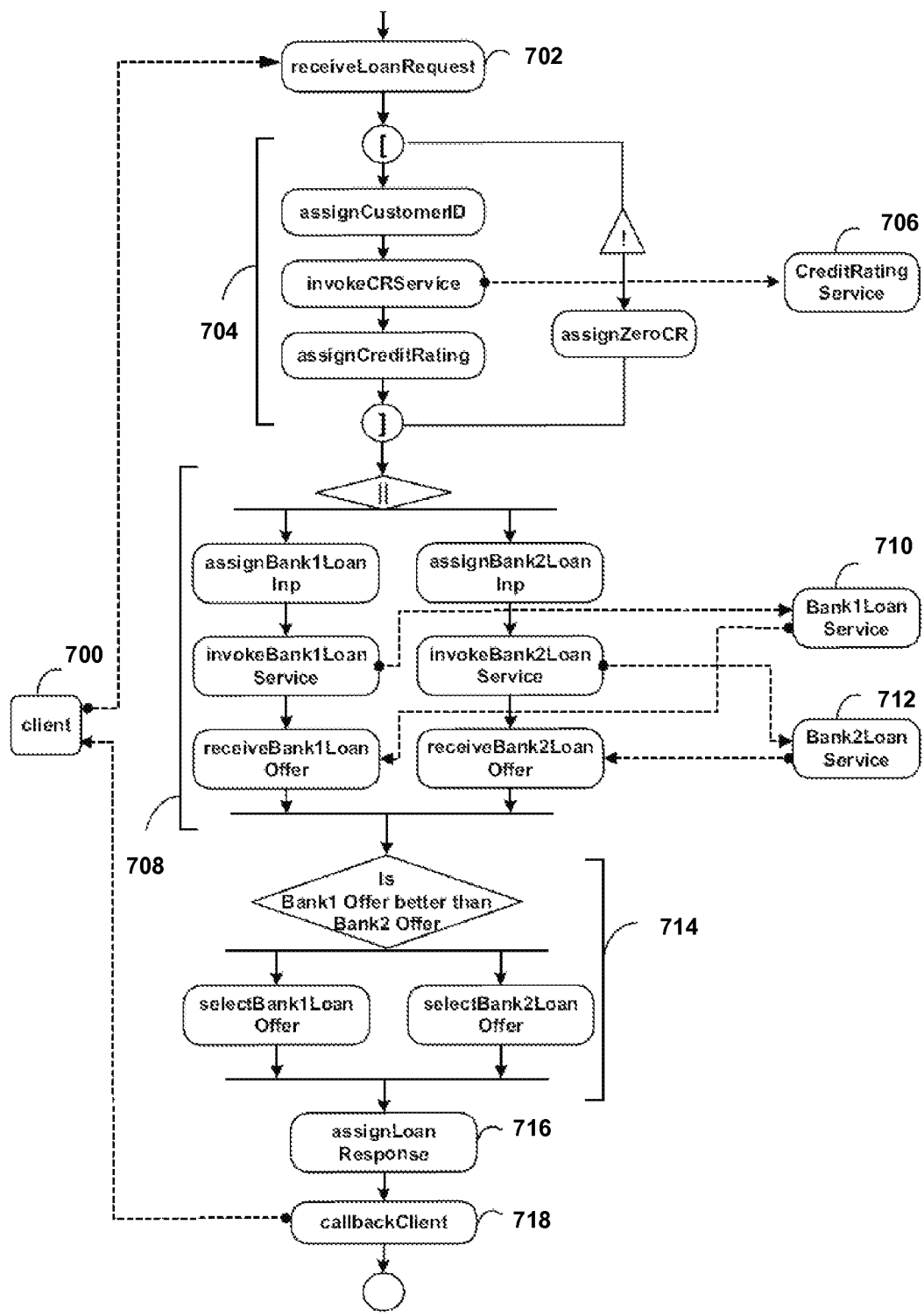
FIG. 7 shows a graphical representation of an exemplary business process, in accordance with an embodiment.

FIG. 7 shows a graphical representation of an exemplary business process, in accordance with an embodiment. The business process depicted in FIG. 7 shows an example of a business process for use in a loan request, which may be deployed to a production server. This business process can be executed in response to a request from Client 700 for a loan.

Activity 702 is a primitive activity operable to receive the request from the client. The client can be any system configured, such as a client or server, to access the production server where this business process is deployed.

Activity 704 is a container activity, which contains several related primitive activities. As shown in the example of FIG. 7, activity 704 is a check credit rating container activity (in this example, a BPEL Scope structured activity) that includes a sequence of primitive activities: assigns a customer ID to the client, invokes an external credit rating service 706 to obtain a credit rating for the client, and on receiving the credit rating response from the credit rating service, assigns the credit rating to a variable.

Activity 708 is also a container activity (in this example, a BPEL Flow structured activity) that accesses external services, in this case to obtain loan offers, through parallel branches of primitive activities. Activity 708 accesses two web services 710 and 712 to obtain loan offers from two financial institutions. Activity 708 obtains these two offers concurrently in two branches of primitive activities. Although two branches are shown in FIG. 7, any number of potential branches are within the scope of embodiments of the present invention, two branches are merely shown for conciseness.

Activity 714 is another container activity (in this example, a BPEL Switch structured activity) that is operable to compare the received loan offers and select one based on predetermined criteria. Activity 716 is a primitive activity that assigns the selected loan offer to a response to the client, which can then be sent by primitive activity 718. Business processes enable otherwise complicated processing and interaction between various components to be expressed at a high level, in this example of requesting a receiving loan offers from various institutions.

Figure 8:
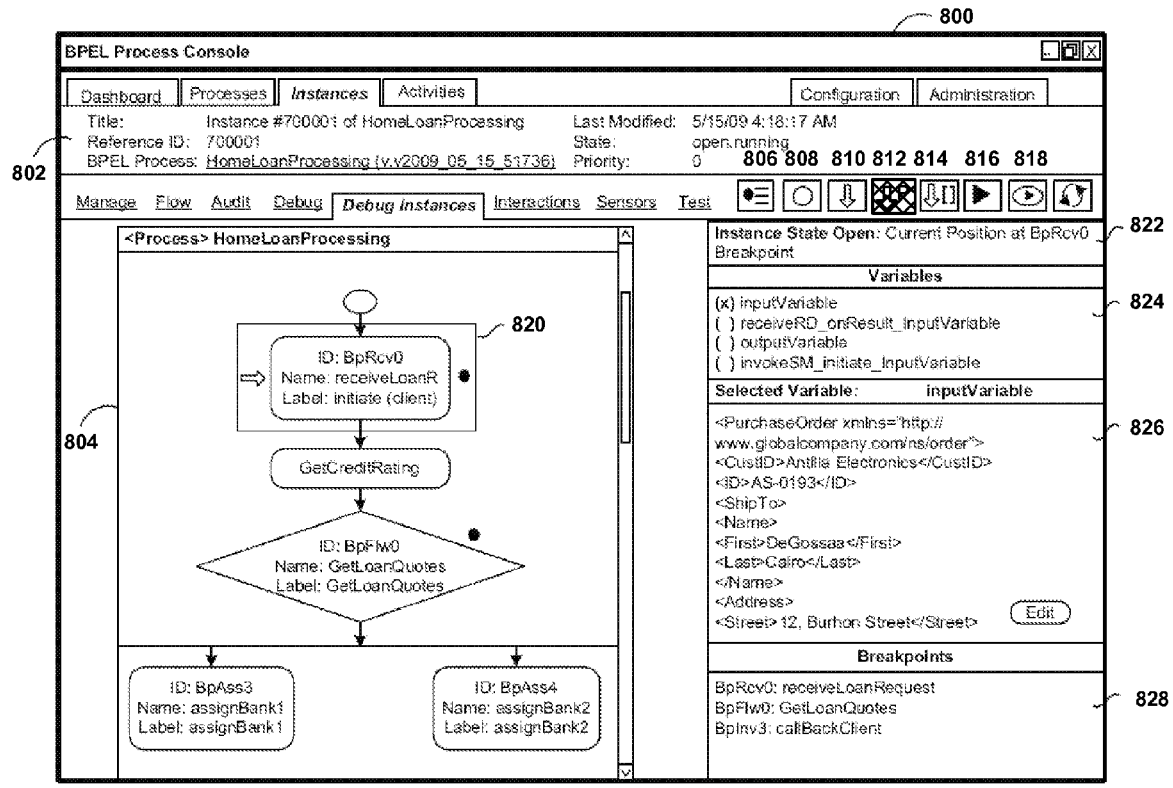
FIGS. 8-12 show exemplary screenshots of a graphical user interface (GUI) presented to a user/developer during a parallel-step debug operation in accordance with an embodiment.

FIGS. 8-12 show exemplary screenshots of a graphical user interface (GUI) presented to the user/developer during a debug operation, in accordance with an embodiment. As shown in FIG. 8, a graphical window 800 presents a GUI that can be displayed at the developer system, and can be utilized by the developer to interact with business processes deployed at the production server. Identification information for the business process instance under test can be shown at 802. This information can include the title of the business process; a reference identifier of the instance of the business process, in addition to other information such as when the business process was last modified and the business process' current state. A graphical representation of the business process being debugged can also be shown, as depicted at 804. The exemplary business process shown at 804 corresponds to that shown in, and described above with reference to, FIG. 7.

As shown in the example of FIG. 8, several icons 806-818 are presented in window 800. Icon 806 enables the developer to set breakpoints and icon 808 enables the developer to clear breakpoints. Icon 810 enables the developer to perform a single-step operation from the current position. This is used to instruct the system to execute the current activity and then pause execution prior to the next activity. Icon 812 enables the developer to perform a parallel step operation. This is used to instruct the system to execute the current activity in each branch and pause prior to the next activity in each branch. This icon can be hidden, disabled, when the current activity is not contained within a parallel activity. Similarly, this icon can be shown or enabled for every current activity within a parallel activity. Because the current activity is a primitive activity that is not within a container activity, icon 812 is shown crosshatched to indicate it is disabled.

Icon 814 enables the developer to perform a step block operation. In a step block operation, all activities included in a container activity are executed, execution is then paused before proceeding to the next activity following the container activity. This icon can be hidden, or disabled, when the current activity is a primitive activity.

Icon 816 enables the developer to resume execution of the instance of the business process. This instructs the system to proceed to execute activities in the business process until the next breakpoint is reached. If the developer were to select icon 816, activity receiveLoanR would be executed, followed by activity GetCreditRating, before pausing upon reaching the breakpoint associated with GetLoanQuotes. Icon 818 enables the developer to clear all breakpoints from the business process and resume execution. If the developer were to select icon 818, execution of the business process would resume and terminate once the business process is complete.

As further shown in the example of FIG. 8, the state of this instance of the business process is "open.running;" thus this instance is currently executing. The current point of execution, or current position, in this instance of the business process is indicated graphically in the box at 820, where activity "receiveLoanR" is highlighted and set off with an arrow. Of further note is the black dot next to this activity, indicating to the developer the presence of a breakpoint associated therewith. This information is also shown in a portion of the display as indicated at 822 which shows the activity ID of the activity where execution is paused. Variables associated with each activity in the business process are shown in a portion of the display as indicated at 824. These variables are user-selectable and, when selected, its contents are shown in a portion of the display as indicated at 826. As shown in FIG. 8, inputVariable is selected. By selecting "edit," the developer can modify the value of inputVariable in the portion of the display at 826. Additionally, the user breakpoints that are currently set in this instance of the business process are shown in a portion of the display as indicated at 828.

Figure 9:
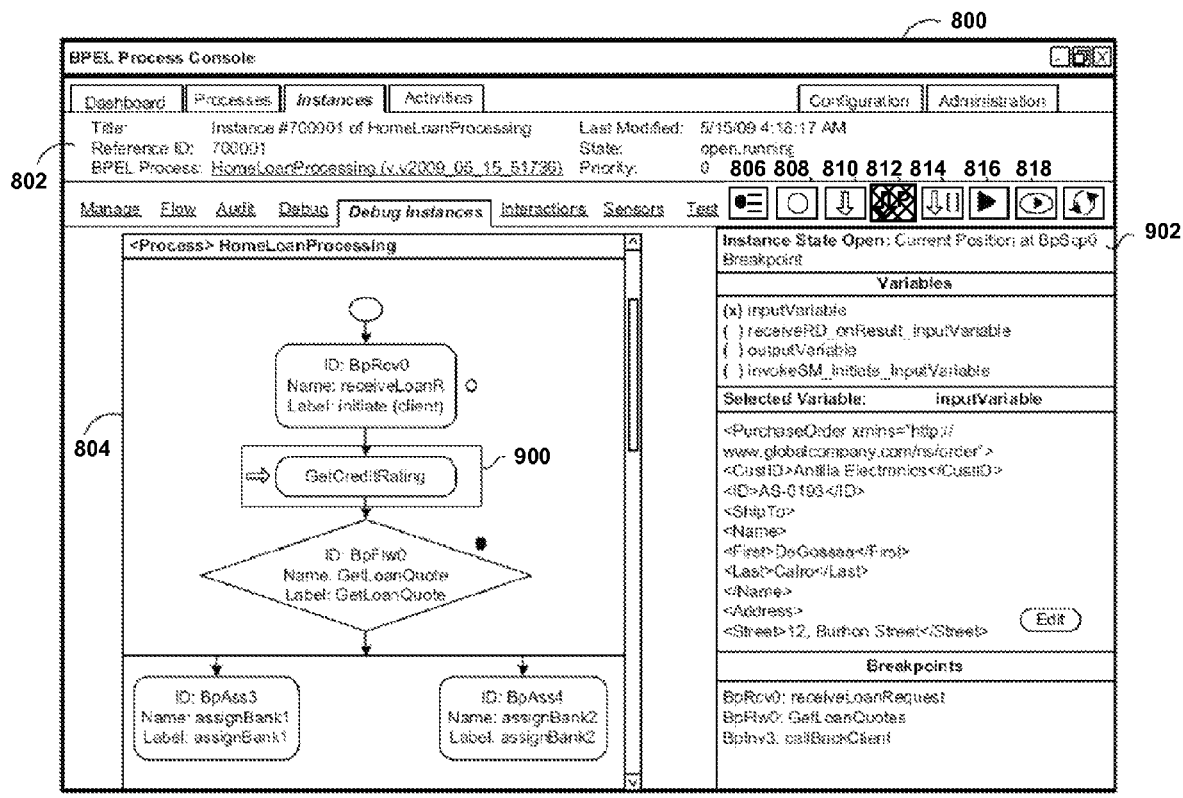

As shown in the example of FIG. 9, processing of this instance of the business process has progressed from receiveLoanR to GetCreditRating, for example by the developer selecting the single-step operation icon. This is indicated graphically in the box at 900 where GetCreditRating is now highlighted and set off with an arrow; and in a portion of the display as indicated at 902 where current position is indicated at the activity ID corresponding to GetCreditRating. As GetCreditRating is not within a parallel activity, icon 812 remains disabled.

Figure 10:
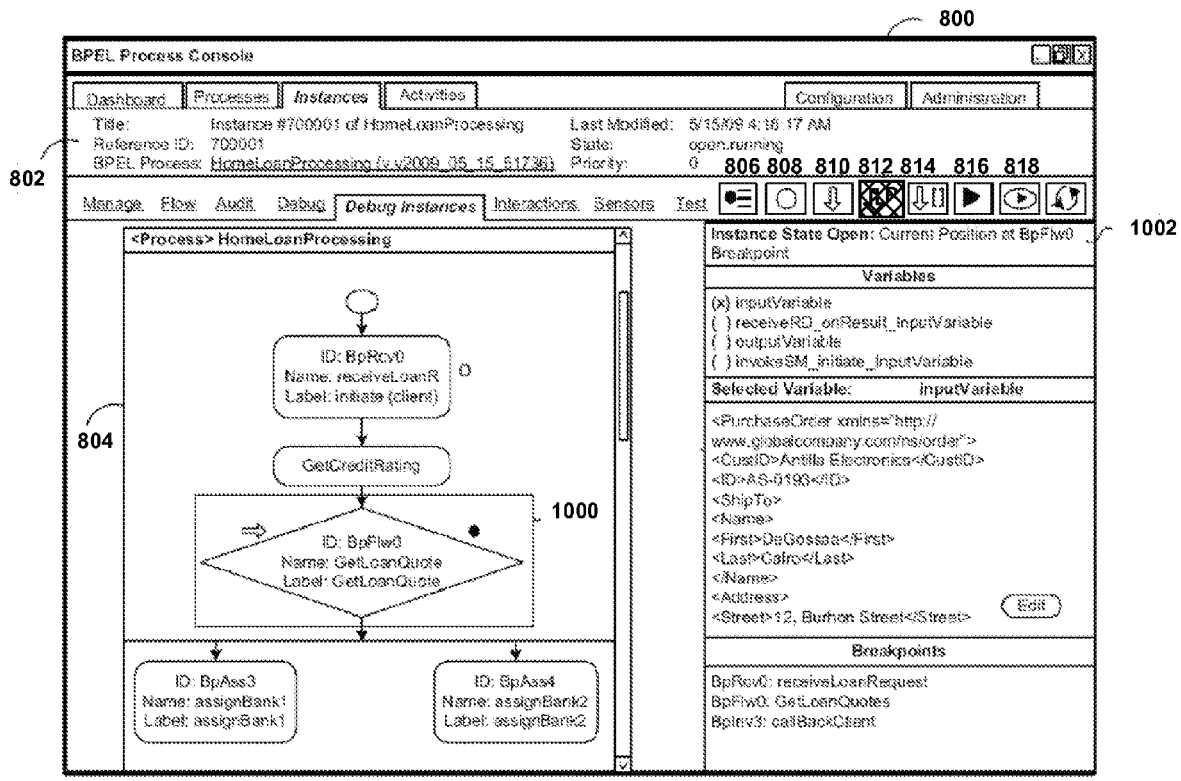

As shown in the example of FIG. 10, GetCreditRating has completed and processing has moved on to GetLoanQuote, in response to the developer selecting the Step-Block operation. This is indicated graphically in the box at 1000 and current position has been updated in a portion of the display as indicated at 1002. As shown in FIG. 10, GetLoanQuote is a parallel activity that includes two parallel branches.

Figure 11:
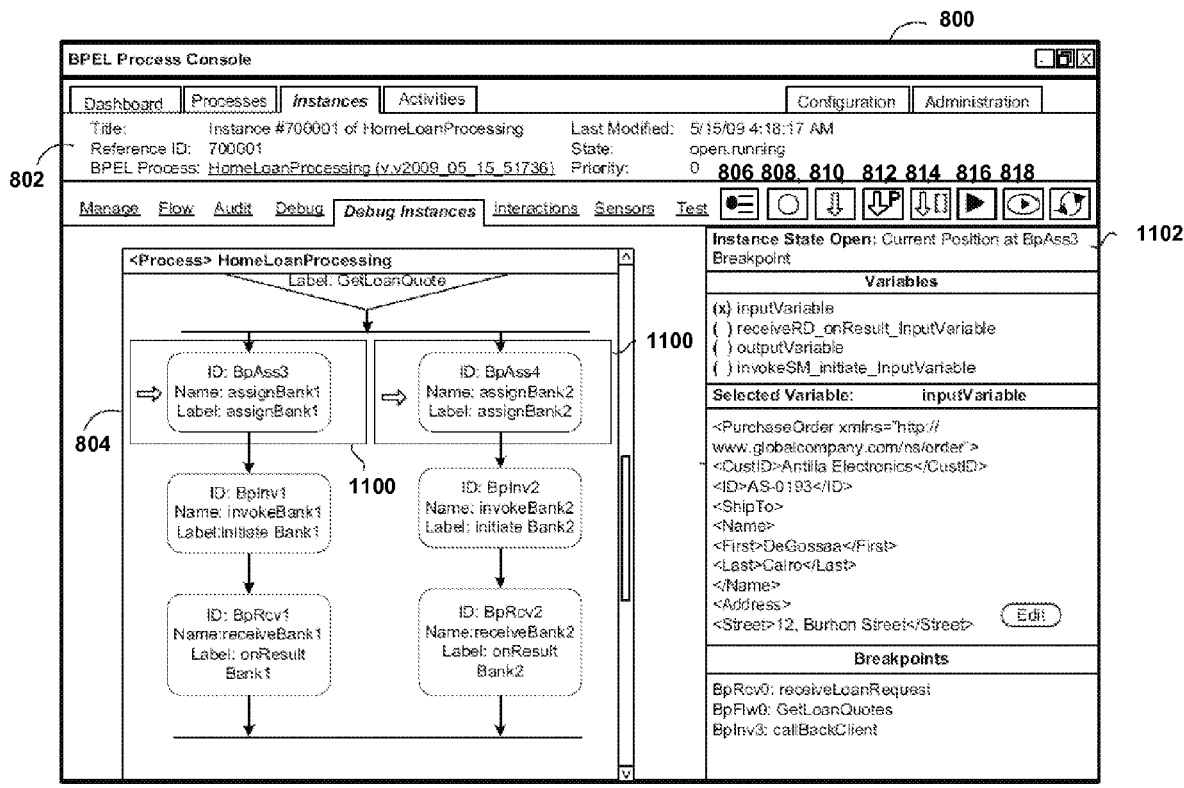

As shown in the example of FIG. 11, in response to the developer selecting a single-step operation, processing begins at the first activity in each branch. The current position is indicated in the two boxes at 1100 and in a portion of the display as indicated at 1102. As shown in FIG. 11, processing is paused within a parallel branch container activity. Accordingly, there are multiple current activities. The current position indicated in the portion of the display at 1102 can list any of the current activities as the current position, according to user preferences or system defaults. From here, the developer can proceed to perform either single-step operations or parallel-step operations. Executing the activities in parallel more closely models the runtime behavior of the BPEL Flow activity in the business process when deployed. If the developer selects the single-step icon, then only activity assignBank1 will execute, while assignBank2 will wait. However, if the developer selects the parallel step icon, then both assignBank1 and assignBank2 will execute in parallel.

In accordance with an embodiment, when the developer selects the parallel-step icon, the business process engine checks with the flow control block to ensure that multiple contained activities are ready to execute and then the business process engine executes the activities concurrently.

As shown in FIG. 11, the first parallel activity in each branch initializes a request variable that will be used to invoke a bank to obtain a loan offer. The business process engine then determines the next activities and adds implicit breakpoints, as per the flowchart show in FIG. 6. The next activities are determined after the current activity has completed. Depending on how the current activity has completed (for example, whether it has completed successfully or if an exception has been thrown) the next activity or activities may vary. These implicit breakpoints can be stored in a data structure such as a breakpoint table. Once each activity is complete, the flow control block identifies the subsequent activities to be executed. The business process engine then determines that there are breakpoints associated with the subsequent activities and execution will pause before the next activity in each branch.

Figure 12:
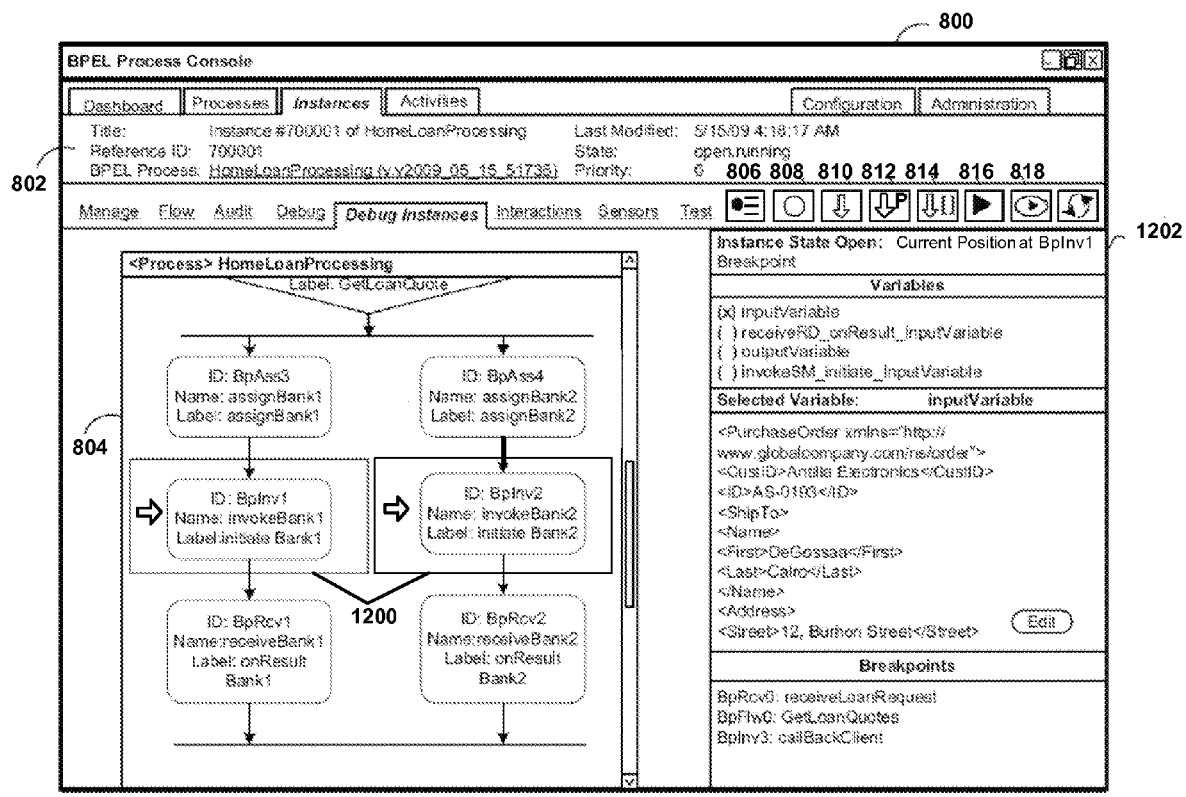

As shown in the example of FIG. 12, the developer has selected the parallel step icon and processing has progressed to the second activity in each branch, i.e., invokeBank1 and invokeBank2. This is shown graphically in the two boxes at 1200, and current position has been updated in a portion of the display as indicated at 1202 to show one of the current activities. The developer can continue to progress through the parallel branches by selecting the parallel step icon.

As described above, business processes can be defined using a variety of business process languages of which BPEL is one example. Execution of business processes can be controlled using a variety of flow control functions including, but not limited to, the token-based flow control system described above. Development, management, and deployment of business processes can be performed locally or remotely and debugging can be performed using an IDE or a web-based tool. While embodiments of the present invention are described as being applicable to debugging of business processes, other embodiments are equally applicable to other programming languages that utilize parallel constructs and semantics similar to those used in business process languages such as BPEL. Although the above has been described with particularity to several exemplary embodiments, alternative implementations also fall within the scope of embodiments of the present invention.

The present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for enabling a developer to concurrently debug parallel activities, comprising:
   receiving a request to debug an at least one business process through a graphical user interface (GUI), wherein the at least one business process includes a parallel activity;
   presenting a graphical representation of the at least one business process;
   receiving input which indicates where one or more breakpoints are to be added to the at least one business process;
   inserting the one or more breakpoints to the at least one business process and recording the one or more breakpoints in a data structure which links each breakpoint to its associated activity;
   instantiating an instance of the at least one business process and executing the instance;
   entering debug mode automatically and pausing execution of the instance when a breakpoint is reached;
   receiving an instruction to perform a parallel-step operation on the parallel activity;
   executing a plurality of current activities in the parallel activity concurrently, wherein said current activities in compiled format containing machine level instructions; and
   pausing execution before executing a next activity, which is determined by a token-based flow control block, wherein availability of a token in a token pool indicates a corresponding activity is ready to be executed next; and
   wherein after the production server executes a plurality of current activities in the parallel activity concurrently, the production server inserts an implicit breakpoint at the next activity.

2. The method of claim 1 wherein the at least one business process is stored in a database accessible by the computer.

3. The method of claim 1 wherein the GUI presents a list of available business processes and is operable to receive a selection of one or more of the available business processes and display graphical representations of each business process in the selection.

4. The method of claim 1 further comprising:
   presenting a plurality of options to perform in debug mode including a single-step operation and a parallel step operation.

5. The method of claim 1 wherein after receiving an instruction to perform a parallel-step operation, performing the step of adding entries to a single-step table for each current activity and enabling a single-step flag.

6. The method of claim 5 further comprising clearing breakpoints from the current activity in each branch and resuming execution of the instance.

7. A system for enabling a developer to concurrently debug parallel activities, comprising:
   a computer including a computer readable medium and processor operating thereon;
   a production server, executing on the computer, which includes at least one business process having a parallel activity, and
   a graphical user interface (GUI), which is accessible to a developer system and presents a graphical representation of the at least one business process;
   wherein the production server is operable to
      receive input which indicates where one or more breakpoints are to be added to the at least one business process,
      insert the one or more breakpoints to the at least one business process, and
      record the one or more breakpoints in a data structure which links each breakpoint to its associated activity;
   wherein upon receiving a request to debug the at least one business process from a client system, the production server
      instantiates an instance of the at least one business process and executes the instance, enters debug mode automatically and pauses execution of the instance when a breakpoint is reached, receives an instruction to perform a parallel-step operation on the parallel activity, executes a plurality of current activities in the parallel activity concurrently, wherein said current activities in compiled format containing machine level instructions, and pauses execution before executing a next activity, which is determined by a token-based flow control block, wherein availability of a token in a token pool indicates a corresponding activity is ready to be executed next, and wherein after the production server executes a plurality of current activities in the parallel activity concurrently, the production server inserts an implicit breakpoint at the next activity.

8. The system of claim 1 wherein the at least one business process is stored in a database accessible by the computer.

9. The system of claim 1 wherein the GUI presents a list of available business processes and is operable to receive a selection of one or more of the available business processes and display graphical representations of each business process in the selection.

10. The system of claim 1 wherein the production server further presents a plurality of options to perform in debug mode including a single-step operation and a parallel-step operation.

11. The system of claim 1 wherein after the production server receives an instruction to perform a parallel-step operation, the production server adds entries to a single-step table for each current activity and enables a single-step flag.

12. The system of claim 11 wherein the production server further clears breakpoints from each current activity and resumes execution of the instance.

13. A non-transitory computer readable storage medium, including instructions stored thereon which when read and executed by a computer cause the computer to perform the steps comprising:

receiving a request to debug an at least one business process through a graphical user interface (GUI), wherein the at least one business process includes a parallel activity;

presenting a graphical representation of the at least one business process;

receiving input which indicates where one or more breakpoints are to be added to the at least one business process;

inserting the one or more breakpoints to the at least one business process and recording the one or more breakpoints in a data structure which links each breakpoint to its associated activity;

instantiating an instance of the at least one business process and executing the instance;

entering debug mode automatically and pausing execution of the instance when a breakpoint is reached;

receiving an instruction to perform a parallel-step operation on the parallel activity;

executing a plurality of current activities in the parallel activity concurrently, wherein said current activities in compiled format containing machine level instructions; and pausing execution before executing a next activity, which is determined by a token-based flow control block, wherein availability of a token in a token pool indicates a corresponding activity is ready to be executed next; and wherein after the production server executes a plurality of current activities in the parallel activity concurrently, the production server inserts an implicit breakpoint at the next activity.

14. The computer readable storage medium of claim 13 wherein the GUI presents a list of available business processes and is operable to receive a selection of one or more of the available business processes and display graphical representations of each business process in the selection.

15. The computer readable storage medium of claim 13 further comprising:

presenting a plurality of options to perform in debug mode including a single-step operation and a parallel step operation.

16. The computer readable storage medium of claim 13 wherein after receiving an instruction to perform a parallel-step operation, performing the step of adding entries to a single-step table for a current activity in each branch and enabling a single-step flag.

17. The computer readable storage medium of claim 16 further comprising clearing breakpoints from the current activity in each branch and resuming execution of the instance.

* * * * *

UNITED STATES PATENT AND TRADEMARK OFFICE
CERTIFICATE OF CORRECTION

Figure 2:
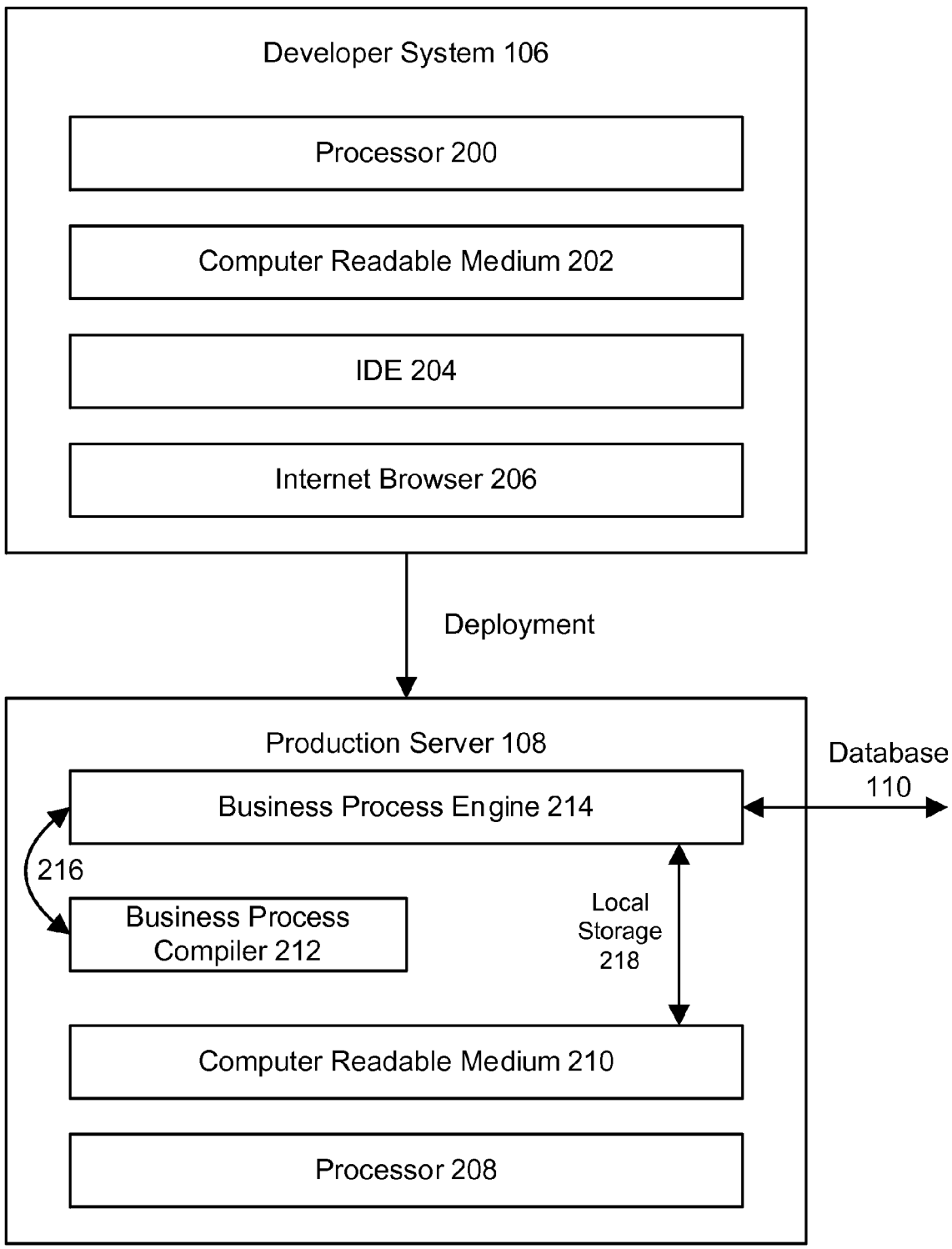
FIG. 2 shows a diagram illustrating interaction between a developer system and a production server.

PATENT NO. : 8,429,622 B2
APPLICATION NO. : 12/761294
DATED : April 23, 2013
INVENTOR(S) : Nanjundaswamy It is certified that error appears in the above-identified patent and that said Letters Patent is hereby corrected as shown below:

In the Drawings:

On sheet 2 of 12, in figure 2, Reference Numeral 214, line 1, delete "En gine" and insert -- Engine --, therefor.

On sheet 4 of 12, in figure 4, Reference Numeral 402, line 1, delete "Se lected" and insert -- Selected --, therefor.

On sheet 4 of 12, in figure 4, Reference Numeral 406, line 1, delete "Proc ess" and insert -- Process --, therefor.

On sheet 4 of 12, in figure 4, Reference Numeral 408, line 1, delete "Proce ss" and insert -- Process --, therefor.

On sheet 6 of 12, in figure 6, Reference Numeral 600, line 1, delete "Proce ss" and insert -- Process --, therefor.

On sheet 6 of 12, in figure 6, Reference Numeral 602, line 1, delete "D ebug" and insert -- Debug --, therefor.

On Sheet 6 of 12, in figure 6, Reference Numeral 604, line 1, delete "Optio ns" and insert -- Options --, therefor.

On sheet 6 of 12, in figure 6, Reference Numeral 606, line 1, delete "Paralle l-Step" and insert -- Parallel-Step --, therefor.

On sheet 6 of 12, in figure 6, Reference Numeral 608, line 1, delete "f or" and insert -- for --, therefor.

Signed and Sealed this
Sixth Day of August, 2013

Teresa Stanek Rea
*Acting Director of the United States Patent and Trademark Office*

CERTIFICATE OF CORRECTION (continued)
U.S. Pat. No. 8,429,622 B2

On sheet 6 of 12, in figure 6, Reference Numeral 614, line 1, delete "Proce ss" and insert -- Process --, therefor.

On sheet 6 of 12, in figure 6, Reference Numeral 616, line 1, delete "Br anch" and insert -- Branch --, therefor.

On sheet 6 of 12, in figure 6, Reference Numeral 618, line 1, delete "Act ivity," and insert -- Activity, --, therefor.

On sheet 6 of 12, in figure 6, Reference Numeral 620, line 1, delete "Activi ty" and insert -- Activity --, therefor.

On sheet 6 of 12, in figure 6, Reference Numeral 622, line 1, delete "Break point" and insert -- Breakpoint --, therefor.

On sheet 6 of 12, in figure 6, Reference Numeral 624, line 1, delete "Opera tion" and insert -- Operation --, therefor.

On sheet 7 of 12, in figure 7, line 4, delete "as signZeroCR" and insert -- assignZeroCR --, therefor.

On sheet 7 of 12, in figure 7, line 5, delete "as signCreditRating" and insert -- assignCreditRating --, therefor.

In the Claims:

In column 14, line 53, in Claim 7, delete "system" and insert -- system, --, therefor.

In column 15, line 19, in Claim 8, delete "claim 1" and insert -- claim 7 --, therefor.

In column 15, line 20, in Claim 9, delete "claim 1" and insert -- claim 7 --, therefor.

In column 15, line 26, in Claim 10, delete "claim 1" and insert -- claim 7 --, therefor.

In column 15, line 30, in Claim 11, delete "claim 1" and insert -- claim 7 --, therefor.